United States Patent
Kobayashi et al.

(10) Patent No.: US 6,803,437 B2
(45) Date of Patent: Oct. 12, 2004

(54) PROCESS FOR PRODUCING A TETRAFLUOROETHYLENE POLYMER HAVING HIGH STRENGTH

(75) Inventors: Shigeki Kobayashi, Ichihara (JP); Jun Hoshikawa, Ichihara (JP); Kazuo Kato, Ichihara (JP); Hiroki Kamiya, Ichihara (JP); Hiroyuki Hirai, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 34 days.

(21) Appl. No.: 10/314,992

(22) Filed: Dec. 10, 2002

(65) Prior Publication Data

US 2003/0109654 A1 Jun. 12, 2003

Related U.S. Application Data

(63) Continuation of application No. PCT/JP02/03212, filed on Mar. 29, 2002.

(30) Foreign Application Priority Data

Apr. 12, 2001 (JP) ........................................ 2001-113551

(51) Int. Cl.$^7$ ............................................ C08F 114/18
(52) U.S. Cl. ........................ 526/250; 525/194; 524/520; 524/545
(58) Field of Search ....................... 525/194; 526/250, 526/255; 524/520, 545

(56) References Cited

U.S. PATENT DOCUMENTS

| | | | | |
|---|---|---|---|---|
| 5,281,680 A | * | 1/1994 | Grot | 526/243 |
| H001736 H | * | 6/1998 | Legare et al. | 525/194 |
| 6,123,851 A | * | 9/2000 | Rychen et al. | 210/673 |
| 6,518,381 B2 | | 2/2003 | Kobayashi et al. | 526/255 |
| 6,703,461 B1 | * | 3/2004 | Tanaka et al. | 526/242 |

FOREIGN PATENT DOCUMENTS

| | | | |
|---|---|---|---|
| EP | 1396502 A1 | * | 3/2004 |
| JP | 60-20911 | | 2/1985 |
| JP | 4-226512 | | 8/1992 |
| JP | 5-4051 | | 1/1993 |
| JP | 05-004051 | * | 1/1993 |
| JP | 7-70211 | | 3/1995 |
| JP | 10-36454 | | 2/1998 |

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

A process for producing a tetrafluoroethylene polymer, which comprises polymerizing tetrafluoroethylene in an aqueous medium in the presence of a water-soluble initiator, wherein the water used for the polymerization is regulated to have a TOC of 100 ppb or lower and/or an electrical conductivity of 1.0 $\mu$S/cm or lower. When this process for producing a tetrafluoroethylene polymer is employed, a decrease or fluctuation in the polymerization rate during the polymerization of tetrafluoroethylene will be minimal, and a deterioration in the physical properties of the obtained tetrafluoroethylene polymer will be minimal.

16 Claims, No Drawings

PROCESS FOR PRODUCING A TETRAFLUOROETHYLENE POLYMER HAVING HIGH STRENGTH

TECHNICAL FIELD

The present invention relates to a process for producing a tetrafluoroethylene polymer, and it relates to a process for producing a tetrafluoroethylene polymer which is capable of providing a fine powder to be used e.g. as a material for a thread seal tape having high strength or as a binder for a fuel cell, and a molding powder or the like, of which a molded product has high strength.

BACKGROUND ART

Heretofore, a tetrafluoroethylene polymer (hereinafter referred to as PTFE) has been obtained by polymerizing tetrafluoroethylene (hereinafter referred to as TFE) alone, or by copolymerizing it with a modifying monomer, as the case requires, and it is used for various applications.

PTFE can be produced by dispersion polymerization or suspension polymerization of TFE. By the dispersion polymerization, it can be obtained in the form of a dispersion having polymer particles dispersed, or in the form of a fine powder obtained by coagulating the polymer dispersion, followed by drying. By the suspension polymerization, the obtained PTFE may be pulverized to obtain a fine powder, and further, this fine powder may be agglomerated to obtain a molding powder.

The dispersion of PTFE may be used in an application wherein it is impregnated to glass cloth to obtain a tent film. Further, a fine powder of PTFE is used as a starting material for a stretchable porous product such as a covering for electric wires, a tube, a thread seal tape, clothing, a filter, etc. Further, the molding powder of PTFE is used to obtain a molded product by e.g. compressing, sintering, followed by cutting.

Usually, in the polymerization of TFE, the amount of the polymerization initiator to be used, is extremely small as compared with polymerization for a usual hydrocarbon type polymer. Further, in order to maintain the mechanical properties of the resulting PTFE to be good, a very high molecular weight is required. Accordingly, the starting material to be used is required to have very high purity in order not to lower the polymerization rate by deactivating grown radicals or not to lower the molecular weight by chain transfer.

Namely, materials such as a dispersing agent and a dispersion stabilizer to be used for the polymerization are required to have very high purity. To meet such requirements, a method has, for example, been proposed as in JP-A-9-157310 in which impurities in paraffin wax are specified by the amount of an antioxidant contained in the paraffin wax. However, even with such paraffin wax, a substantial fluctuation may sometimes be observed in the polymerization rate or in the physical properties of the obtained polymer, and such can not be regarded as sufficient, as the specification for the impurities in the paraffin wax.

Further, very high purity is required also with respect to water to be used for the polymerization of TFE, and if even in a trace amount of impurities influential over the polymerization are contained therein, they may give a substantial influence over the polymerization rate or over the physical properties of the obtained polymer. Accordingly, it is usually required to employ water which has a very low content of e.g. hydrocarbon type organic substances or ions, which are influential over the polymerization.

However, it is very difficult to identify such impurities which adversely affect the polymerization of PTFE especially because their contents are very small. Heretofore, no adequate qualitative and quantitative analyses have been made, and the influence of impurities contained in raw materials, has not been apparent till actual polymerization. Especially, no case has been reported in which the purity of water to be used for the polymerization is prescribed, and no prescription has been made clear with respect to the purity of water to be used for the polymerization.

It is an object of the present invention to provide a process for producing PTFE, whereby a decrease or fluctuation in the polymerization rate during the polymerization of PTFE, will be minimal, the obtained PTFE will have a low standard specific gravity with minimal fluctuation, and a deterioration or fluctuation of the mechanical properties of the obtained PTFE will be minimal.

By present inventors considered that the impurities which adversely affect the polymerization of TFE are hydrocarbon type compounds capable of undergoing chain transfer during the polymerization, ionic compounds, and water-soluble compounds which readily enter into micelles in water as the reaction site during the polymerization, or organic colloids and extensively studied their influences. As a result, it has been found that when water purified to have a TOC and/or an electrical conductivity within specific ranges, is used as the water to be used for the polymerization, a decrease or fluctuation in the polymerization rate can be minimized, and a deterioration or fluctuation of the physical properties of the resulting PTFE can be minimized. The present invention has been accomplished on the basis of this discovery.

DISCLOSURE OF THE INVENTION

The present invention provides a process for producing PTFE, which comprises polymerizing TFE in an aqueous medium in the presence of a water-soluble initiator, wherein the water used for the polymerization has a TOC of 100 ppb or lower and/or an electrical conductivity of 1.0 $\mu$S/cm or lower.

Further, the present invention provides the above process for producing PTFE, wherein the polymerization is carried out in an aqueous medium in the presence of a dispersing agent and a dispersion stabilizer.

BEST MODE FOR CARRYING OUT THE INVENTION

The process for producing PTFE of the present invention is characterized in that water having a TOC and an electrical conductivity within the specified ranges, is used as the water to be used for the polymerization. The TOC is total organic carbon i.e. a total amount of organic carbon, which is used as an index for the content of organic carbon in water. In the present invention, the water to be used for the polymerization may be one which satisfies either one of conditions that the TOC is 100 ppb or lower, and the electrical conductivity is 1.0 $\mu$S/cm or lower, but one satisfying both conditions, is preferred.

In a case where the water to be used for the polymerization is defined by such TOC, the TOC is 100 ppb or lower, preferably 20 ppb or lower.

In a case where the water to be used for the polymerization is defined by the electrical conductivity, the electrical conductivity is 1.0 $\mu$S/cm or lower, preferably 0.1 $\mu$S/cm or lower. By using water having a TOC and/or an electrical conductivity within these ranges, the polymerization rate and the physical properties of the resulting PTFE will be improved, and a fluctuation in the physical properties will be small. Here, the electrical conductivity is in a relation of an inverse number to the resistivity. Accordingly, the range of the electrical conductivity of the present invention may be represented also by a range of the resistivity. The range of the resistivity is 100 Ω·cm or higher, preferably 1000 Ω·cm or higher.

In the dispersion polymerization of TFE, it is common to employ a method wherein in addition to a polymerization initiator, a dispersing agent made of a perfluoro compound or a dispersion stabilizer such as paraffin wax is added to the polymerization system. If the dispersing agent made of a perfluoro compound or paraffin wax is present in the polymerization system, the values of the TOC and the electrical conductivity of water in the polymerization system will be substantially higher than the values specified in the process of the present invention. However, when water having a purity as defined in the process of the present invention is used, and a commercially available dispersing agent made of a perfluoro compound having a high purity e.g. with a APHA color of at most 50, or a dispersion stabilizer such as paraffin wax having a high purity, e.g. where the content of the antioxidant is not more than 50 ppm, is used, the polymerization will proceed without any problem even if the TOC in the aqueous phase during the polymerization is high as mentioned above, and the standard specific gravity of the resulting PTFE, will be low, and the mechanical properties and their stability will also be good. Accordingly, in such a polymerization system, it is inappropriate to apply a method wherein the TOC or the electrical conductivity of water in the polymerization system is defined on the basis of the dispersing agent or the dispersion stabilizer. The TOC or the electrical conductivity component attributable to the paraffin wax or the dispersing agent is considered not to correspond to the above-mentioned impurities which adversely affect the polymerization for PTFE.

On the other hand, with respect to the water to be used for the polymerization, even when the same paraffin wax and dispersing agent were used, there was a substantial difference in the polymerization rate and in the physical properties of the obtained PTFE depending upon the difference in the TOC and the electrical conductivity of the water. This indicates that the TOC and the electrically conductive substance containing in the water would present an extremely large influence over the polymerization for PTFE, and it is very effective to define their amounts.

Such a tendency is more remarkable in the suspension polymerization for PTFE, wherein no substance other than the water and the polymerization initiator, is contained, and if the TOC and the electrical conductivity of the water exceed the values defined in the process of the present invention, a decrease or fluctuation of the polymerization rate, or a deterioration or fluctuation of the physical properties of the resulting PTFE will result, or the polymerization will not proceed at all.

PTFE obtained by the present invention may be a homopolymer of TFE or a copolymer of TFE with a modified monomer such as a fluorinated monomer having an ethylenically unsaturated group, other than TFE. The fluorinated monomer having an ethylenically unsaturated group may, for example, be a fluorinated monomer such as hexafluoropropylene, perfluorobutene-1, perfluorohexene-1, perfluorononene-1, perfluoro(methyl vinyl ether), perfluoro (ethyl vinyl ether), perfluoro(propyl vinyl ether), perfluoro (heptyl vinyl ether), (perfluoromethyl)ethylene, (perfluorobutyl)ethylene or chlorotrifluoroethylene. These fluorinated monomers may be used alone or in combination as a mixture of two or more of them.

As the modified monomer, perfluoro(propyl vinyl ether) or hexafluoropropylene is more preferred. The modified monomer is usually preferably at most 1 mass %, more preferably at most 0.5 mass %.

The aqueous dispersion polymerization of TFE may, for example, be carried out as follows.

The aqueous dispersion polymerization can be carried out by using TFE alone, or TFE and the modified monomer, in an aqueous medium containing a polymerization initiator and, if necessary, a dispersing agent. The polymerization temperature is usually within a range of from 50 to 120° C., preferably within a range of from 60 to 100° C. The polymerization pressure may be suitably selected, but may be usually within a range of from 0.5 to 4.0 MPa, preferably within a range of from 1.0 to 2.5 MPa.

The aqueous suspension polymerization can be carried out by using TFE alone, or TFE and the modified monomer, in an aqueous medium containing a polymerization initiator and, if necessary, a very small amount of a dispersing agent. The polymerization temperature is usually within a range of from 30 to 120° C., preferably within a range of from 50 to 100° C. The polymerization pressure may be suitably selected, but may be usually within a range of from 0.5 to 4.0 MPa, preferably within a range of from 0.5 to 2.5 MPa.

As the dispersing agent to be used for the aqueous dispersion polymerization, an anionic surfactant having a small chain transfer property is more preferred, and a fluorocarbon type surfactant is particularly preferred. As a specific example, $XC_nF_{2n}COOM$ (wherein X is a hydrogen atom, a chlorine atom, a fluorine atom or $(CF_3)_2CF$, M is a hydrogen atom, $NH_4$ or an alkali metal, and n is an integer of from 6 to 12), $C_mF_{2m+1}O(CF(CF_3)CF_2O)_pCF(CF_3)COOM$ (wherein M is a hydrogen atom, $NH_4$ or an alkali metal, m is an integer of from 1 to 12, and p is an integer of from 0 to 5), $C_nF_{2n+1}SO_3M$, or $C_nF_{2n+1}CH_2CH_2SO_3M$ (in these two formulae, n and M are as defined above) may, for example, be mentioned. A perfluorocarbon type surfactant is more preferred, and $C_7F_{15}COONH_4$, $C_8F_{17}COONH_4$, $C_9F_{19}COONH_4$, $C_{10}F_{21}COONH_4$, $C_7F_{15}COONa$, $C_8F_{17}COONa$, $C_9F_{19}COONa$, $C_7F_{15}COOK$, $C_8F_{17}COOK$, $C_9F_{19}COOK$, $C_3F_7O(CF(CF_3)CF_2O)_2CF(CF_3)COONH_4$ may, for example, be mentioned. They may be used alone or in combination as a mixture of two or more of them. As the dispersing agent, it is preferred to employ a commercial product having a high purity, for example, one having an APHA color of at most 50.

The content of the dispersing agent is preferably within a range of from 250 to 5000 ppm, based on the mass of the water to be used, and in order to further improve the stability of the aqueous dispersion, a dispersing agent may be added during the polymerization.

In the present invention, the polymerization initiator is a water-soluble polymerization initiator and is preferably a water-soluble radical polymerization initiator or an aqueous redox type polymerization initiator. As the water-soluble radical polymerization initiator, a persulfate such as ammonium persulfate or potassium persulfate, or a water-soluble organic peroxide such as bissuccinic acid peroxide, bisglutaric acid peroxide or tert-butyl hydroperoxide, is preferred. They may be used alone or in combination as a mixture of two or of them. Further, as to the method for addition, it is preferred to employ either a method of addition all at once or continuous addition. As the redox type polymerization initiator, a combination of a water-soluble oxidizing agent such as a persulfate or a bromate with a reducing agent such as a sulfite or diimine, may, for example, be mentioned. In a case where an aqueous redox type polymerization initiator is employed, it is preferred that either the oxidizing agent or the reducing agent is preliminarily charged into an autoclave, and then, the other is continuously added to initiate the polymerization, and a method is more preferred wherein the oxidizing agent is preliminarily charged into an autoclave, and then, the reducing agent is continuously added.

The content of the polymerization initiator may be suitably selected, but it is preferably from 2 to 600 ppm, based on the amount of water. The smaller the content of the polymerization initiator, the smaller the standard specific gravity, i.e. PTFE having a large average molecular weight tends to be obtained. If the content of the polymerization initiator is too small, the polymerization rate tends to be too slow, and if it is too large, the standard specific gravity of the resulting PTFE tends to be high.

The aqueous dispersion polymerization is preferably carried out in the presence of a dispersion stabilizer. As the dispersion stabilizer, paraffin wax, a fluorinated oil, a fluorinated solvent or silicone oil is, for example, preferred. They may be used alone or in combination as a mixture of two or more of them. It is particularly preferred to carry out the polymerization in the presence of paraffin wax. The paraffin wax may be liquid, semisolid or solid at room temperature, but is preferably a saturated hydrocarbon having at least 12 carbon atoms. The melting point of the paraffin wax is usually preferably from 40 to 65° C., more preferably from 50 to 65° C.

The amount of the paraffin wax is preferably from 0.1 to 12 mass %, more preferably from 0.1 to 8 mass %, based on the amount of the water to be used.

As the dispersion stabilizer, it is preferred to employ a commercial product having a high purity, and for example, the content of the antioxidant is preferably at most 100 ppm, particularly preferably at most 40 ppm.

The aqueous dispersion polymerization is carried out usually by stirring the aqueous polymerization mixture gently. The stirring condition is controlled so that the formed PTFE fine particles in the aqueous dispersion will not coagulate. The aqueous dispersion polymerization is carried out usually until the concentration of PTFE fine particles in the aqueous dispersion will be from 15 to 40 mass %.

PTFE is coagulated from the obtained aqueous dispersion and dried to obtain a PTFE fine powder. As the coagulation method, it is preferred to coagulate PTFE fine particles by stirring the aqueous dispersion at a high speed. At that time, a coagulating agent may be added. As the coagulating agent, a polyvalent organic salt such as ammonium carbonate, a mineral acid, a cationic surfactant or an alcohol is, for example, preferred, and ammonium carbonate is more preferred.

Drying of PTFE obtained in a wet state by coagulation, may be carried out at an optional temperature, but is preferably carried out within a range of from 100 to 250° C., more preferably within a range of from 130 to 200° C. By the drying, a PTFE fine powder can be obtained.

By the present invention, the standard specific gravity (hereinafter referred to as SSG) of the obtained PTFE can easily be made to be 2.165 or lower. SSG is an index for the average molecular weight. It can be said that the smaller the value of SSG, the higher the average molecular weight. SSG tends to decrease, as the average molecular weight increases. Namely, in the present invention, one having a small value of SSG and a high average molecular weight can easily be obtained.

The suspension polymerization is polymerization of TFE in the above dispersion polymerization, wherein the dispersing agent, wax, etc. other than the water and the polymerization initiator, are not contained. The polymerization conditions, etc. may be the same as the above aqueous dispersion polymerization.

Now, the process for producing PTFE of the present invention will be exemplified, but the present invention is by no means thereby limited. The following methods were employed for the measurements of TOC, the electrical conductivity, the content of the antioxidant, the APHA color and the standard specific gravity (SSG).

Method for Measuring TOC

The measurement of TOC was carried out by means of TAC-102P, manufactured by T&C Technical Company.

Method for Measuring the Electrical Conductivity

The measurement of the electrical conductivity was carried out at a water temperature of 20° C. by means of TAC-102P, manufactured by T&C Technical Company.

Method for Measuring the Content of the Antioxidant

Paraffin wax was dissolved in n-hexane, and the maximum absorbance at a wavelength of from 240 to 340 nm of the solution was measured by an ultraviolet spectrophotometer. Then, the content of the antioxidant in the paraffin wax was determined by calculation based on the preliminarily measured molar absorption coefficient of the antioxidant.

Method for Measuring the APHA Color

Measured in accordance with the method of JIS K0071-1.

Method for Measuring the Standard Specific Gravity (SSG)

Measured in accordance with the method of ASTM-4895.

EXAMPLE 1

Into a polymerization vessel having an internal capacity of 100 l and equipped with a stirrer, 740 g of paraffin wax (manufactured by Nippon Oil Co., Ltd., antioxidant content: 10 ppm), 60 l of ultrapure water having a TOC of 15 ppb and an electrical conductivity of 0.08 $\mu$S/cm and 190 g of ammonium perfluorooctanoate (APHA color: 20) were charged. The polymerization vessel was deaerated and purged with nitrogen and then heated to 70° C. After the temperature was stabilized, TFE was introduced to a pressure of 1.86 MPa. While stirring the content, 7.5 g of disuccinic acid peroxide dissolved in 1 l of water, was added to initiate the polymerization. As the polymerization proceeded, TFE was consumed, and the pressure in the polymerization vessel decreased. To maintain the pressure to be constant, TFE was continuously supplied. Further, upon expiration of 30 minutes from initiation of the polymerization, 300 g of an aqueous ammonium perfluorooctanoate solution dissolved in 1 l of water, was added. After expiration of 60 minutes from initiation of the polymerization, the temperature in the polymerization vessel was raised to 80° C. at a rate of 20° C. per hour. After initiation of the polymerization, when the amount of TFE supplied reached 25 kg, stirring and supply of TFE were terminated, and TFE in the polymerization vessel was purged, followed by nitrogen substitution to obtain an aqueous dispersion of PTFE. The time required for this polymerization was 122 minutes. The obtained dispersion was coagulated, and PTFE in a wet state was separated and dried at 160° C. to obtain a PTFE fine powder. The obtained PTFE had a SSG of 2.162.

COMPARATIVE EXAMPLE 1

An aqueous dispersion of PTFE was obtained in the same manner as in Example 1 except that raw water before purification, having a TOC of 540 ppm and an electrical conductivity of 3.1 µS/cm, was used. The time required for this polymerization was 247 minutes. In the same manner as in Example 1, a PTFE fine powder was obtained. The obtained PTFE had a SSG of 2.171.

EXAMPLE 2

Into a polymerization vessel having an internal capacity of 50 l and equipped with a stirrer, 30 l of ultrapure water having a TOC of 15 ppb and an electrical conductivity of 0.08 µS/cm, was charged. The polymerization vessel was deaerated and purged with nitrogen to completely remove oxygen in the system and to fill the interior of the vessel with nitrogen. The interior of the vessel was heated to 78° C., and after the temperature was stabilized, the pressure in the vessel was adjusted to be 0.147 MPa, and then, TFE was introduced to bring the pressure in the vessel to 0.833 MPa. While stirring the content, 8 ml of 28% aqueous ammonia and 35 mg of ammonium persulfate were added to initiate the polymerization. As the polymerization proceeded, TFE was consumed, and the pressure in the polymerization vessel decreased. To maintain the pressure to be constant, TFE was continuously supplied. After initiation of the polymerization, when the amount of TFE supplied, reached 4.5 kg, stirring and supply of TFE were terminated, and TFE in the polymerization vessel was purged, followed by nitrogen substitution to obtain beard-like granules of PTFE. The time required for this polymerization was 70 minutes. The obtained granules were pulverized to a level of from 300 to 500 µm and then finely pulverized to 35 µm by a jet-O-mizer (manufactured by Hosokawa Micron Corporation). The obtained PTFE fine powder had a SSG of 2.153

COMPARATIVE EXAMPLE 2

Polymerization was attempted in the same manner as in Example 2 except that raw water before purification, having a TOC of 520 ppm and an electrical conductivity of 3.2 µS/cm, was used, but the polymerization was extremely slow and not a practical level.

As described in the foregoing, according to the process for producing PTFE of the present invention, a decrease or fluctuation in the polymerization rate during the polymerization for PTFE will be minimal, and PTFE, of which a deterioration or fluctuation in the physical properties is minimal, can be obtained.

The entire disclosure of Japanese Patent Application No. 2001-113551 filed on Apr. 12, 2001 including specification, claims and summary is incorporated herein by reference in its entirety.

What is claimed is:

1. A process for producing a tetrafluoroethylene polymer, which comprises
polymerizing tetrafluoroethylene in an aqueous medium in the presence of a water-soluble initiator, wherein the water used for the polymerization has at least one of a TOC of 100 ppb or lower or an electrical conductivity of 1.0 µS/cm or lower at 20° C.

2. The process for producing a tetrafluoroethylene polymer according to claim 1, wherein the polymerization is carried out in an aqueous medium in the presence of at least one of a dispersing agent or a dispersion stabilizer.

3. The process for producing a tetrafluoroethylene polymer according to claim 1, wherein the TOC is 20 ppb or lower.

4. The process for producing a tetrafluoroethylene polymer according to claim 1, wherein the electrical conductivity is 0.1 µS/cm or lower at 20° C.

5. The process for producing a tetrafluoroethylene polymer according to claim 1, wherein the TOC is 20 ppb or lower, and the electrical conductivity is 0.1 µS/cm or lower at 20° C.

6. The process for producing a tetrafluoropolymer according to claim 1, wherein the polymerization is carried out in an aqueous medium in the presence of a dispersing agent and a dispersion stabilizer.

7. The process for producing a tetrafluoroethylene polymer according to claim 1, wherein the polymerizing is carried out in the presence of at least one of a perfluoro compound having an APHA color of at most 50 or a paraffin wax having an antioxidant content of no more than 50 ppm.

8. The process for producing a tetrafluoroethylene polymer according to claim 1, wherein the polymerizing is carried out in the presence of only the water and the polymerization initiator.

9. A process for producing a fluorinated polymer, comprising:
polymerizing a mixture of one or more fluorinated ethylenically unsaturated monomers present in a mixture with water, in the presence of a water-soluble initiator, wherein the water has at least one of a TOC of 100 ppb or lower or an electrical conductivity of 1.0 µS/cm or lower at 20° C.

10. The process according to claim 9, wherein the polymerizing is carried out in the presence of at least one of a dispersing agent or a dispersion stabilizer.

11. The process of claim 9, wherein the water has a TOC of 20 ppb or lower.

12. The process of claim 9, wherein the water has an electrical conductivity of 0.1 µS/cm or lower at 20° C.

13. The process according to claim 9, wherein the water has a TOC of 20 ppb or lower and an electrical conductivity of 0.1 µS/cm or lower at 20° C.

14. The process according to claim 9, wherein the polymerizing is carried out in the presence of a dispersing agent and a dispersion stabilizer.

15. The process according to claim 9, wherein the polymerizing is carried out in the presence of at least one of a perfluoro compound having an APHA color of at most 50 or a paraffin wax having an antioxidant content of not more than 50 ppm.

16. The process according to claim 9, wherein the polymerizing is carried out on a mixture consisting of water, one or more fluorinated ethylenically unsaturated monomers and the polymerization initiator.

* * * * *